United States Patent
De Goes et al.

(10) Patent No.: US 10,586,401 B2
(45) Date of Patent: Mar. 10, 2020

(54) SCULPTING BRUSHES BASED ON SOLUTIONS OF ELASTICITY

(71) Applicant: Pixar, Emeryville, CA (US)

(72) Inventors: Fernando Ferrari De Goes, Berkeley, CA (US); Douglas L. James, El Granada, CA (US)

(73) Assignee: Pixar, Emeryville, CA (US)

( * ) Notice: Subject to any disclaimer, the term of this patent is extended or adjusted under 35 U.S.C. 154(b) by 0 days.

(21) Appl. No.: 15/969,587

(22) Filed: May 2, 2018

(65) Prior Publication Data

US 2018/0330554 A1 Nov. 15, 2018

Related U.S. Application Data

(60) Provisional application No. 62/500,241, filed on May 2, 2017.

(51) Int. Cl.
*G06T 19/20* (2011.01)
*G06T 11/00* (2006.01)

(52) U.S. Cl.
CPC ............ *G06T 19/20* (2013.01); *G06T 11/001* (2013.01); *G06T 2219/2012* (2013.01); *G06T 2219/2016* (2013.01)

(58) Field of Classification Search
None
See application file for complete search history.

(56) References Cited

U.S. PATENT DOCUMENTS

| | | | | |
|---|---|---|---|---|
| 5,835,086 A | * | 11/1998 | Bradstreet | G06T 11/001 345/581 |
| 6,963,350 B1 | * | 11/2005 | Perani | G06T 11/001 345/619 |
| 8,817,017 B2 | * | 8/2014 | Vaganov | B44D 2/002 345/419 |

(Continued)

OTHER PUBLICATIONS

Christensen et al., "Deformable Templates Using Large Deformation Kinematics", 1996, IEEE Transactions on Image Processing, vol. 5, No. 10, pp. 1435-1447 (Year: 1996).*

(Continued)

*Primary Examiner* — Phong X Nguyen
(74) *Attorney, Agent, or Firm* — Patterson + Sheridan, LLP

(57) ABSTRACT

Systems, methods, and articles of manufacture for physically-based sculpting of virtual elastic materials are provided. The physically-based sculpting in one embodiment simulates elastic responses to localized distributions of force produced by sculpting with a brush-like force (e.g., grab, twist, pinch, scale) using one or more regularized solutions to equations of linear elasticity applied to a virtual infinite elastic space, referred to herein as "regularized Kelvinlets." In other cases, compound brushes, each based on a regularized Kelvinlet, may be used for arbitrarily fast decay; a linear combination of brushes based on regularized Kelvinlets may be used to impose pointwise constraints on displacements and gradients; locally affine forms of regularized Kelvinlets may be used for certain sculpting brushes; brush displacement constraints may be imposed by superimposing regularized Kelvinlets of different radial scales; and symmetrized deformations may be generated by copying and reflecting forces produced by regularized Kelvinlets.

20 Claims, 8 Drawing Sheets

(56) References Cited

U.S. PATENT DOCUMENTS

| | | | | |
|---|---|---|---|---|
| 8,970,628 B1* | 3/2015 | Jensen | | G06T 19/20 345/419 |
| 2002/0130908 A1* | 9/2002 | Wilensky | | G06T 11/00 715/863 |
| 2006/0133564 A1* | 6/2006 | Langan | | G01N 23/046 378/8 |
| 2006/0267978 A1* | 11/2006 | Litke | | G06T 17/20 345/419 |
| 2007/0146325 A1* | 6/2007 | Poston | | G06F 3/0317 345/163 |
| 2008/0192049 A1* | 8/2008 | Schiwietz | | G06T 3/0093 345/420 |
| 2009/0070674 A1* | 3/2009 | Johnston | | G06F 3/048 715/716 |
| 2009/0129650 A1* | 5/2009 | Hawkes | | G06T 7/344 382/131 |
| 2011/0251829 A1* | 10/2011 | Baxter, III | | G06T 11/001 703/1 |
| 2012/0281019 A1* | 11/2012 | Tamstorf | | G06T 3/0093 345/646 |
| 2013/0235071 A1* | 9/2013 | Ubillos | | G06F 3/04845 345/600 |
| 2013/0335333 A1* | 12/2013 | Kukulski | | G06F 3/04845 345/173 |
| 2014/0081610 A1* | 3/2014 | DiVerdi | | G06F 3/03545 703/6 |
| 2015/0371422 A1* | 12/2015 | Kokemohr | | G06T 11/60 382/311 |
| 2016/0266763 A1* | 9/2016 | Gupta | | G06F 3/04845 |
| 2017/0351793 A1* | 12/2017 | Tamstorf | | G06F 17/5018 |

OTHER PUBLICATIONS

Servin et al., "Interactive Simulation of Elastic Deformable Materials", 2006, SIGRAD 2006, pp. 22-32 (Year: 2006).*

Savenkov et al., "An analysis of one regularization approach for solution of pure Neumann problem", 2008, Fraunhofer-Institut für Techno- und Wirtschaftsmathematik ITWM, pp. 1-27 (Year: 2008).*

Sarstedt, "Comparisons of Sculpting Efficiency between Mudbox and ZBrush", 2012, Faculty of Engineering and Sustainable Development, University of Gävle, pp. 1-28 (Year: 2012).*

Autodesk. 2016. Maya User Guide. (2016). https://autodesk.com/maya. [abstract only].

Cortez, R. "The Method of Regularized Stokeslets", 2001 SIAM Journal on Scientific Computing, vol. 23, Issue 4, pp. 1204-1225. [abstract only].

Kim, S. "Microstructures in Elastic Media: Principles and Computational Methods", Nov. 3, 1994, Oxford University Press Inc, 256 pages. [abstract only].

Slaughter, W. S., "The Linearized Theory of Elasticity", 2002, Birkhäuser Basel, 543 pages. [abstract only].

* cited by examiner

SCULPTING BRUSHES BASED ON SOLUTIONS OF ELASTICITY

CROSS-REFERENCE TO RELATED APPLICATIONS

This application claims benefit of U.S. provisional patent application Ser. No. 62/500,241, filed May 2, 2017, which is herein incorporated by reference in its entirety.

BACKGROUND

Field

Aspects of the disclosure presented herein relate to sculpting of graphics objects and, more specifically, to physically-based sculpting of graphics objects.

Description of the Related Art

Deformation of geometry is a critical element of computer animation production pipelines. Digital sculpting tools have been employed to produce such geometry deformations. As used herein, "sculpting" refers to digitally modifying virtual geometry or images, such as by pushing, pulling, smoothing, grabbing, or pinching the geometry or images. Most traditional sculpting tools are purely geometric and do not account for the shape or volume (or area in the two-dimensional case) that a virtual geometry or image occupies. As a result, such sculpting tools tend to collapse the volumes (or areas in the two-dimensional case) of virtual geometries and images.

SUMMARY

One embodiment of this disclosure provides a computer-implemented method that generally includes receiving a selection of a sculpting brush and a brush size, and receiving a movement from an input device. The method further includes determining a deformation of a graphics object based, at least in part, on the selected sculpting brush and brush size, the received movement from the input device, and one or more regularized solutions to an equation of linear elasticity, where the one or more regularized solutions include a specified Poisson ratio parameter value. In addition, the method includes rendering one or more images based, at least in part, on the graphics object with the determined deformation.

Other embodiments include, without limitation, a computer-readable medium that includes instructions that enable a processing unit to implement one or more embodiments of the disclosed method, as well as a system configured to implement one or more aspects of the disclosed method.

BRIEF DESCRIPTION OF THE DRAWINGS

So that the manner in which the above recited aspects are attained and can be understood in detail, a more particular description of this disclosure, briefly summarized above, may be had by reference to the appended drawings. Note, however, the appended drawings illustrate only typical aspects of this disclosure and are therefore not to be considered limiting of its scope.

DETAILED DESCRIPTION

Figure 1:
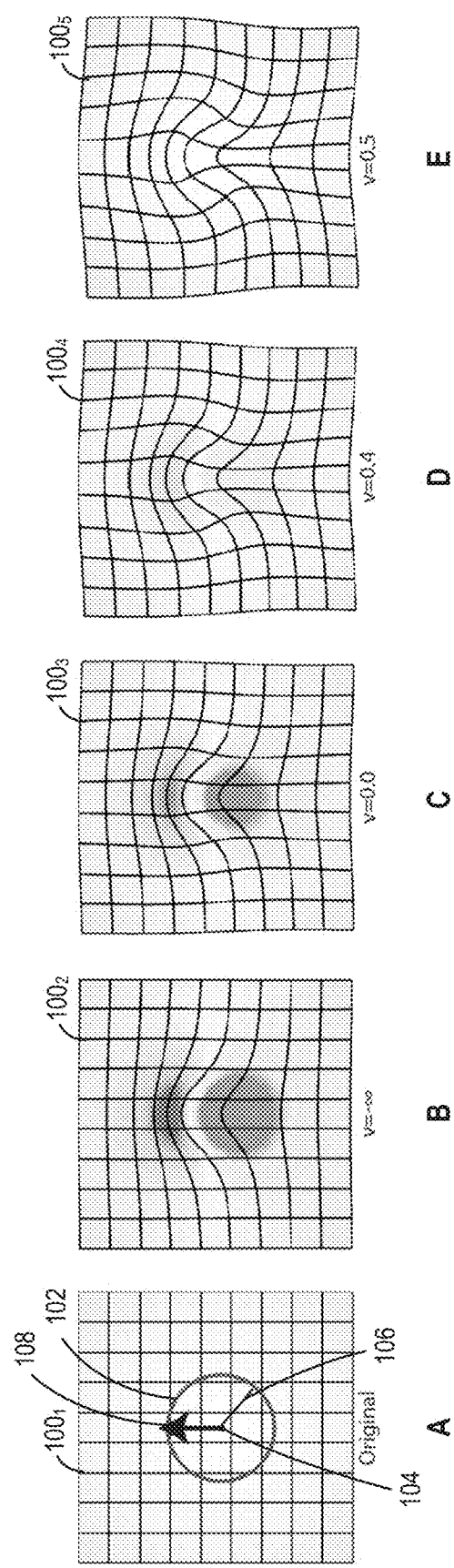
FIG. 1 illustrates example deformations of a graphics object that may preserve area, according to an embodiment.

Embodiments presented herein provide techniques for physically-based sculpting of graphics objects representing elastic materials. As used herein, "graphics objects" include three-dimensional (3D) and two-dimensional (2D) virtual geometries and images. Traditional physics based deformers work by numerically solving equations of underlying discrete deformation models, which tends to be slow and can create an impediment to interactive sculpting. Further, such traditional deformers typically require tedious setup steps such as volumetric meshing, boundary condition specification, or preprocessing to accelerate the simulation. By contrast, the physically-based sculpting in one embodiment simulates elastic responses to localized distributions of force that are produced by sculpting with a brush-like force (e.g., grab, twist, pinch, scale) using regularized solution(s) to equations of linear elasticity for the brush-like force, applied to a virtual infinite elastic space. Fundamental solutions of linear elasticity for singular loads are commonly known as Kelvinlets, but Kelvinlets have singularities which require dividing by zero. The regularization of such solutions, which remove the singularities but are still solutions to the equations of linear elasticity, are referred to herein as "regularized Kelvinlets." As discussed in greater detail below, regularized Kelvinlets provide analytical closed-form expressions that allow simulations to be free of geometric discretization, to be less computationally intensive than traditional physically-based deformers, and to not require relatively large amounts of memory. Instead, brush-like deformations may be rapidly evaluated on the fly for sculpting sessions, with interactive control of compression of the elastic material. Further, unlike traditional sculpting tools that are geometric and do not account for the shape or volume (or area in the two-dimensional case) that a graphics object occupies, sculpting brushes utilizing regularized Kelvinlets can preserve volume (or area in the two-dimensional case) of a shape.

The typical long-range falloffs of regularized Kelvinlets may be addressed in some embodiments using a multi-scale extrapolation scheme that builds compound brushes with arbitrarily fast decay (i.e., the effect of the brush can be made to fall off faster away from the brush center), thereby giving the user more control and enabling highly localized edits. For more specialized control, a linear combination of brushes based on regularized Kelvinlets may be used to impose pointwise constraints on displacements and gradients through a single linear solve. Where the sculpting brush produces an affine transformation rather than a translation, a locally affine form of a regularized Kelvinlet may be used, by evaluating a spatial derivative of the regularized Kelvinlet. Brush displacement constraints may also be imposed using a superposition of regularized Kelvinlets of different radial scales. In addition, symmetrized deformations may be generated by copying and reflecting the forces produced by regularized Kelvinlets.

Herein, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a sculpting application) or related data available in the cloud. For example, a sculpting application could execute on a computing system in the cloud and use regularized Kelvinlets to simulate localized distributions of force on a material produced by sculpting and render such a simulation as disclosed herein. Doing so allows a user to access this information from any computing system attached to a network connected to the cloud (e.g., the Internet).

Referring now to FIG. 1, example deformations of a square graphics object, represented by grids 100$_{2-5}$ illustrating local area loss and gain, are shown, according to an embodiment. Panel A shows the grid 100$_1$ prior to the application of a grab sculpting brush, which may preserve area, to deform the square graphics object. Although deformations in 2D are shown for illustrative purposes, both 2D and 3D regularized Kelvinlets, and extensions thereto, are disclosed herein. Further, techniques disclosed herein may be used to deform 2D images and geometries, as well as 3D geometries. Panels B-C show examples of regularized Kelvinlets being used to produce interactive elastic responses to grab displacements. In particular, the examples in panels B-C illustrate deformations to the square graphics object caused by a bi-scale grab sculpting brush, which is a difference of two regularized Kelvinlets and is discussed in greater detail below, with a specified Poisson value ν being used to dictate material compressibility (i.e., how compressible the material is, if at all), from the incompressible ν=0.5 to softer, compressible materials, up to ν=−∞. The Poisson value may be specified manually or automatically in any suitable manner, such as using a graphical user interface or as a default value. A representation of the grab sculpting brush may be displayed to the user as a circle 102 with a user-selectable radius 104 defining the brush size, as well as a center 106 where, e.g., the user initially clicked with a mouse. As described in greater detail below, a displacement (e.g., of a mouse pointer or any other suitable measurement of displacement) from the original center 106, represented by an arrow 108 in FIG. 1, may be used by a sculpting application (e.g., sculpting application 822 discussed below with respect to FIG. 8) to derive a force, and the sculpting application may then use such a force to evaluate the displacement generated by the regularized Kelvinlet analytically for points on the square graphics object and move those points according to the evaluation, thereby producing a physically-based spatial deformation. As shown, use of regularized Kelvinlets may preserve area after the grab brush is applied to deform the square graphics object, with larger values of ν leading to more bulging, e.g., along the silhouette of the square. In particular, a Poisson ratio of ν=0.5 produces the most bulging, as area is preserved exactly. Where the displacement of the pointer is aligned with a point, there will be additional displacement of that point, ultimately resulting in the bulging effects shown in panels C-E, and vice versa for points that are orthogonal to the displacement of the pointer. At the other extreme, volume is not preserved where the Poisson ratio is set to ν=−∞. The grids 100$_{2-5}$ illustrate the local area loss and gain associated with the different Poisson ratios. In particular, pseudocolors in the grids 100$_{2-5}$ encode a range from compression of 50% (shown in blue) to dilation of 50% (shown in red) relative to the rest area of the original grid 100$_1$.

More formally, in an infinite 3D continuum, the quasi-static equilibrium state of linear elasticity is determined by a displacement field $u: \mathbb{R}^3 \to \mathbb{R}^3$ that minimizes the elastic potential energy $$E(u) = \frac{\mu}{2}\|\nabla u\|^2 + \frac{\mu}{2(1-2\nu)}\|\nabla \cdot u\|^2 - \langle b, u \rangle, \tag{1}$$

where $\|\cdot\|$ and $\langle \cdot, \cdot \rangle$ are integrated over the infinite elastic volume. The first term in equation (1) controls the smoothness of the displacement field, the second term penalizes infinitesimal volume change, and the last term indicates the external body forces b to be counteracted. In this formulation, linear homogeneous and isotropic material parameters are given by the elastic shear modulus μ, which is a simple scaling factor indicating the material stiffness, and the Poisson ratio ν, which as described dictates the material compressibility. By computing the critical point of equation (1), the optimal displacement field u may be associated with the solution of the Navier-Cauchy equation:

$$\mu \Delta u + \frac{\mu}{(1-2\nu)} \nabla(\nabla \cdot u) + b = 0. \tag{2}$$

In the case of a concentrated body load due to a force vector f at a point $x_0$, such as a force from the elastic grab brush shown in FIG. 1, the body load is $b(x)=f\delta(x-x_0)$ and the solution to equation (2) defines a (singular) fundamental solution of linear elasticity, which is also referred to as the Kelvin's state or Kelvinlet and can be written as $$u(r) = \left[\frac{(a-b)}{r}I + \frac{b}{r^3}rr^t\right]f \equiv K(r)f, \tag{3}$$

where $r=x-x_0$ is the relative position vector from the load location $x_0$ to an observation point x, and $r=\|r\|$ is the norm of the relative position vector. Such a fundamental solution defines the response to an impulse that perturbs the system. In one embodiment, r may be a vector from a point of a virtual geometry to be deformed to the center of a sculpting brush. The coefficients in equation (3) are physical parameters of the form $a=1/(4\pi\mu)$ and $b=a/[4(1-\nu)]$. K(r) is referred to as the Green's function for linear elasticity and defines a 3×3 matrix mapping the force vector f at $x_0$ to the displacement vector u at a relative position r. In one embodiment, the force vector may be derived from the movement of a mouse pointer. Although a mouse pointer movement, determined based on signals indicating movement from a mouse, is used herein as a reference example, some embodiments may utilize movements received from other types of input devices, such as finger gesture movements received from a touchscreen. The first term in K(r) resembles the Laplacian Green's function scaled by a constant, while the second term controls volume compression by modifying the elastic response based on the alignment of the relative position vector r to the force vector f. Further, no boundary conditions are needed for the definition of Kelvinlets, as the displacement fields produced by equation (3) are the minimizer of the elastic potential energy over infinite space. In the special case of incompressible materials, i.e., where the Poisson ratio is ν=1/2, for a pointwise load with force vector f, the (singular) fundamental solution of the Stokes equation $$\mu \Delta u + b - \nabla p = 0 \text{ subject to } \nabla \cdot u = 0 \quad (4)$$

is known as the Stokeslet and matches the expression in equation (3) with ν=1/2 (i.e., b=a/2).

A concentrated body load at the point $x_0$ introduces a singularity to the Kelvinlet of equation (3), as r becomes 0 and the divisions by zero in equation (3) make the displacement and derivatives of the Kelvinlet indefinite nearby $x_0$. As a result, the singular Kelvinlet is numerically unsuitable for digital sculpting. One embodiment overcomes the singularity at $x_0$ through a regularization scheme that considers a smooth body load $b(r)=f\rho_\epsilon(r)$ with force vector f and normalized density function $\rho_\epsilon(r)$ distributed around $x_0$ by a radial scale $\epsilon > 0$. In such a case, the regularized distance may be defined as $r_\epsilon = \sqrt{r^2 + \epsilon^2}$ and the normalized density function set to be of the form $$\rho_\epsilon(r) = \frac{15\epsilon^4}{8\pi} \frac{1}{r_\epsilon^7}. \quad (5)$$

Figure 2:
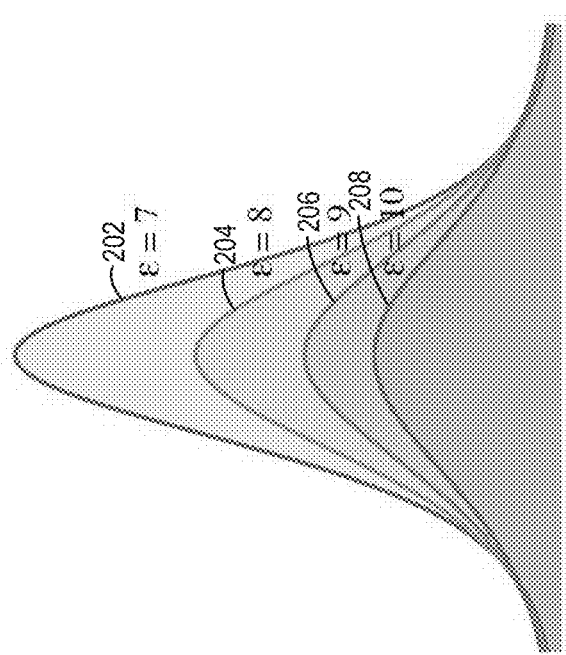
FIG. 2 illustrates examples of normalized density functions, according to an embodiment.

That is, the normalized density function spreads the force in a neighborhood of $x_0$ rather than being concentrated at $x_0$, thereby removing the singularity in (i.e., regularizing) the Kelvinlet. FIG. 2 illustrates examples of normalized density functions for various values of ε, according to an embodiment. In particular, examples in which ε=7, ε=8, ε=9, and ε=10 are shown. In alternative embodiments, other density functions (and thereby regularized solutions) may be used. Using the load distribution of equation (5), i.e., when the force vector is multiplied by equation (5), the solution to the elastostatics equation (2) may be derived as follows. Given a load distribution b(r), the Papkovich-Neuber (PN) potentials correspond to a pair of scalar-valued and vector-valued harmonic fields given by the integrals $$\Psi(r) = \int_{\mathbb{R}^3} \frac{b(s)}{4\pi \|r-s\|} ds, \quad \phi(r) = \int_{\mathbb{R}^3} \frac{s^t b(s)}{4\pi \|r-s\|} ds.$$

Once the PN potentials are known, the displacement solution for equation (2) may be computed by $$u(r) = \frac{1}{\mu}\left[\Psi(r) + \frac{1}{4(1-\nu)} \nabla(\phi(r) - r^t \Psi(r))\right]. \quad (6)$$

For the load $b(r)=f\rho_\epsilon(r)$ discussed above, with force vector f and normalized distribution $\rho_\epsilon(r)$ given by equation (5), $$\begin{cases} \Psi(r) = f\left[\int_{\mathbb{R}^3} \frac{\rho_\epsilon(s)}{4\pi\|r-s\|} ds\right] = f\psi_\epsilon(r) \\ \phi(r) = f^t\left[\int_{\mathbb{R}^3} \frac{s\rho_\epsilon(s)}{4\pi\|r-s\|} ds\right] = f^t \Phi_\epsilon(r) \end{cases} \quad (7)$$

The scalar field $\psi_\epsilon$ can be interpreted as the electric potential associated with the charge density $\rho_\epsilon(s)$. Similarly, the i-th component of the vector field $\Phi_\epsilon$ corresponds to the electric potential with charge density $s_i\rho_\epsilon(s)$. The closed-form expression for $\psi_\epsilon$ is:

$$\psi_\epsilon(r) = \frac{1}{8\pi}\left[\frac{2}{r_\epsilon} + \frac{\epsilon^2}{r_\epsilon^3}\right].$$

The expression for $\Phi_\epsilon$ may be derived by computing an infinite Laplace series in spherical coordinates which, after some algebraic manipulations, simplifies to $$\Phi_\epsilon(r) = -\frac{3\epsilon^2}{8\pi} \frac{r}{r_\epsilon^5}.$$

Then, substituting the $\Phi_\epsilon$ and $\psi_\epsilon$ above into equation (6) gives the following solution to the elastostatics equation (2) associated with the load distribution of equation (5), which is referred to herein as a regularized Kelvinlet:

$$u_\epsilon(r) = \left[\frac{(a-b)}{r_\epsilon}I + \frac{b}{r_\epsilon^3} rr^t + \frac{a}{2}\frac{\epsilon^2}{r_\epsilon^3}I\right]f \equiv K_\epsilon(r)f. \quad (8)$$

Compared to the Kelvinlet of equation (3), the regularized Kelvinlet includes an extra $$\frac{\epsilon^2}{r_\epsilon^3}$$

term, and reproduces the singular case as the radial scale ε approaches zero. Moreover, the undesirable $$\frac{1}{r}$$

singularity of Kelvinlets is regularized at r=0 using a $1/r_\epsilon$ while keeping the O(1/r) asymptotic decay as r→∞. The resulting displacements are finite, differentiable, and localized around $x_0$, in contrast to the original Kelvinlets that produced a singularity at $x_0$. It can also be verified that the deformation gradient at $x_0$ is trivial, i.e., $\nabla u_\epsilon(0)=0$, meaning that the deformation at a point under the load is locally rigid.

Using the regularized Kelvinlet of equation (8), a grab brush may be constructed that assigns the load center $x_0$ to the brush tip and sets the brush radius as ε in equation (8). Returning to FIG. 1, the load center $x_0$ would be set to the brush tip 104 at its original location (e.g., where the user clicks with a mouse) and ε would be set as the brush radius 106. As a result, when the brush size is increased, the load distribution becomes wider. Given a force vector f, a sculpting application may evaluate the displacement generated by the regularized Kelvinlet analytically for points (i.e., vertices) of a 3D virtual geometry (or more generally, for any point in $\mathbb{R}^3$) and then move those points according to the evaluation, thereby producing a physically-based spatial deformation. In one embodiment, the force vector f may also be parameterized in terms of the brush tip displacement $\bar{u}$. In such a case, equation (8) may be expanded with the linear constraint $u_\epsilon(0)=\bar{u}$, leading to $$u_\epsilon(r) = c\epsilon K_\epsilon(r)\bar{u}, \quad (9)$$

where $c=2/(3a-2b)$. The parameterization of the force vector f in terms of the brush tip displacement $\bar{u}$ makes the brush independent of the shear modulus $\mu$, so the only material parameter affecting the deformation is the Poisson ratio $v$. In particular, as the elastic material being deformed becomes increasingly incompressible (i.e., as $v$ approaches 0.5), an increasing bulging effect is produced. In addition, when the Poisson ratio is set to the (unphysical but feasible) value $v=\pm\infty$, the second term in equation (8) is annihilated and a displacement field produced by the regularized Kelvinlet simplifies to a simple grab brush with a radial falloff.

Figure 3:
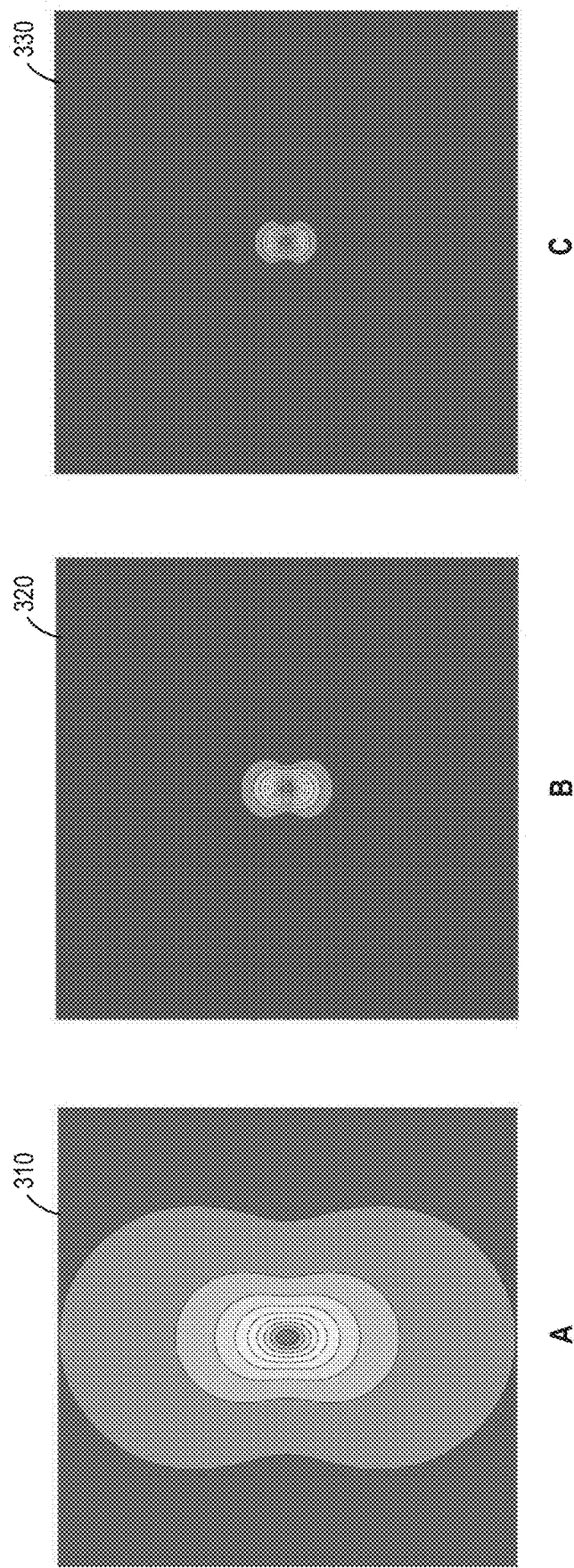
FIG. 3 illustrates multi-scale extrapolation of regularized Kelvinlets for faster decay, according to an embodiment.

FIG. 3 illustrates multi-scale extrapolation of regularized Kelvinlets for faster decay, according to an embodiment. The spatial decay of the regularized Kelvinlet described above is determined by the equations of linear elasticity, producing a fixed falloff that may make the resulting elastic deformations inadequate for fine sculpts in which faster decay is desired. In some embodiments, the sculpting application may use a linear combination of regularized Kelvinlets of different radial scales to produce decays that are faster than that produced by the regularized Kelvinlet of equation (8). That is, an extrapolation scheme is employed to construct physically-based brushes with arbitrarily fast decays by linearly combining regularized Kelvinlets of different radial scales. Due to the superposition principle, such compound brushes form high-order regularized Kelvinlets that satisfy the elastostatics equation (2). That is, several regularized Kelvinlet brushes, each with a slightly different size ($\epsilon$) may be combined, with the difference of sizes producing a sharper falloff of the combined brush's effect away from the brush center.

Illustratively, FIG. 3 shows examples of the far-field decays generated by a single regularized Kelvinlet (panel A), a bi-scale extrapolation (panel B) involving a linear combination of two regularized Kelvinlets, and a tri-scale extrapolation (panel C) involving a linear combination of three regularized Kelvinlets, all of which are computed with the same tip displacement $\bar{u}t$ and Poisson parameter value $v=\frac{1}{2}$. The bi-scale and tri-scale regularized Kelvinlets are discussed in greater detail below. As shown, the bi-scale extrapolation of panel B falls off faster than the single regularized Kelvinlet of panel A, with the displacement caused by the bi-scale extrapolation being concentrated closer to the center of the brush than the displacement caused by the single regularized Kelvinlet. The tri-scale extrapolation of panel C falls off even faster than the bi-scale extrapolation of panel B. Further, the brushes shown in FIG. 3 are parameterized by a unit displacement at the origin, leading to norm values in the interval [0,1].

To better understand the far-field decay of a regularized Kelvinlet $u_\epsilon(r)$, consider the asymptotic expansion of the matrix $K_\epsilon(r)$ as $r\to\infty$, whose first terms are $$C_1(\hat{r})\left(\frac{1}{r}\right) + \epsilon^2 C_3(\hat{r})\left(\frac{1}{r^3}\right) + \epsilon^4 C_5(\hat{r})\left(\frac{1}{r^5}\right) + O\left(\frac{1}{r^7}\right),$$

where the coefficients $C_i(\hat{r})$ indicate 3×3 matrices in terms of the normalized relative position $\hat{r}=r/r$, and material parameters $\mu$ and $v$. Such a expansion reveals an $$O\left(\frac{1}{r}\right)$$

leading-order decay followed by odd powers of $$\frac{1}{r}$$

and even powers of $\epsilon$. By properly combining n regularized Kelvinlet matrices $K_{\epsilon_i}(r)$ with different $\epsilon_i$ values, the leading n−1 terms can be canceled out, hastening the displacement falloff.

The simplest case of extrapolation, shown in panel B of FIG. 3, is the difference of two regularized Kelvinlets of radii $\epsilon_1 < \epsilon_2$:

$$u_{\epsilon_1,\epsilon_2}(r) = [K_{\epsilon_1}(r) - K_{\epsilon_2}(r)]f. \quad (10)$$

Equation (10) corresponds to the physical response to two body loads applied at the same location, where the force pushing the smaller region $\epsilon_1$-region is compensated by an equal but opposite pull over a spatially larger $\epsilon_2$-region. Such a bi-scale extrapolation may be considered as an approximation of the first derivative of $u_\epsilon$ with respect to $\epsilon$. In the asymptotic expansion of equation (10), the first term cancels and the net result has a leading-order decay of $$O\left(\frac{1}{r^3}\right),$$

which is faster than a single regularized Kelvinlet. In addition, the tip displacement $\bar{u}$ may be reproduced by parameterizing the force vector f via the linear constraint $u_{\epsilon_1,\epsilon_2}(0)=\bar{u}$, yielding $$u_{\epsilon_1,\epsilon_2}(r) = c\left(\frac{1}{\epsilon_1} - \frac{1}{\epsilon_2}\right)^{-1} [K_{\epsilon_1}(r) - K_{\epsilon_2}(r)]\bar{u}. \quad (11)$$

As shown in panel C, even greater locality of order $$O\left(\frac{1}{r^5}\right)$$

may be generated by employing a tri-scale extrapolation:

$$u_{\epsilon_1,\epsilon_2,\epsilon_3}(r) = [w_1 K_{\epsilon_1}(r) + w_2 K_{\epsilon_2}(r) + w_3 K_{\epsilon_3}(r)]f, \quad (12)$$

with distinct radial scales $\epsilon_1 < \epsilon_2 < \epsilon_3$ and weights $w_1, w_2, w_3$. The asymptotic expansion of equation (12) gives $$(\Sigma_i w_i)C_1(\hat{r})\left(\frac{1}{r}\right) + (\Sigma_i w_i \epsilon_i^2)C_3(\hat{r})\left(\frac{1}{r^3}\right) + O\left(\frac{1}{r^5}\right).$$

The two leading terms of such an asymptotic expansion cancel, leaving just the $$O\left(\frac{1}{r^5}\right),$$

term when the weights are set to $$w_1=1,\ w_2=-(\epsilon_3^2-\epsilon_1^2)/(\epsilon_3^2-\epsilon_2^2),\ w_3=(\epsilon_2^2-\epsilon_1^2)/(\epsilon_3^2-\epsilon_2^2).$$

This solution provides an approximation of the second derivative of $u_\epsilon$ with respect to $\epsilon$. As before, the tri-scale deformation may be parameterized in terms of tip displacement $\bar{u}$, which takes the form $$u_{\epsilon_1,\epsilon_2,\epsilon_3}(r) = c\left(\Sigma_i \frac{w_i}{\epsilon_i}\right)^{-1}[\Sigma_i w_i K_{\epsilon_i}(r)]\bar{u}. \quad (13)$$

Although a user may adjust each radial scale individually, setting, $\epsilon_2$ and $\epsilon_3$ to small increments of $\epsilon_1$ leads to a better approximation of the derivatives of $u_\epsilon$, creating a faster falloff in the proximity of the brush center and a higher-order long-range decay. In one embodiment, $\epsilon_{i+1}=1.1\epsilon_i$ may be used, where $\epsilon_1$ corresponds to the brush radius, i.e., the radius of the second regularized Kelvinlet is 10% larger than the first, the radius of the third regularized Kelvinlet is 10% larger than the second, etc.

Although bi-scale and tri-scale expansions are discussed above as examples, in other embodiments the multi-scale extrapolation disclosed herein may be continued indefinitely to produce brushes of arbitrarily high order decay and increasing locality.

Figure 4:
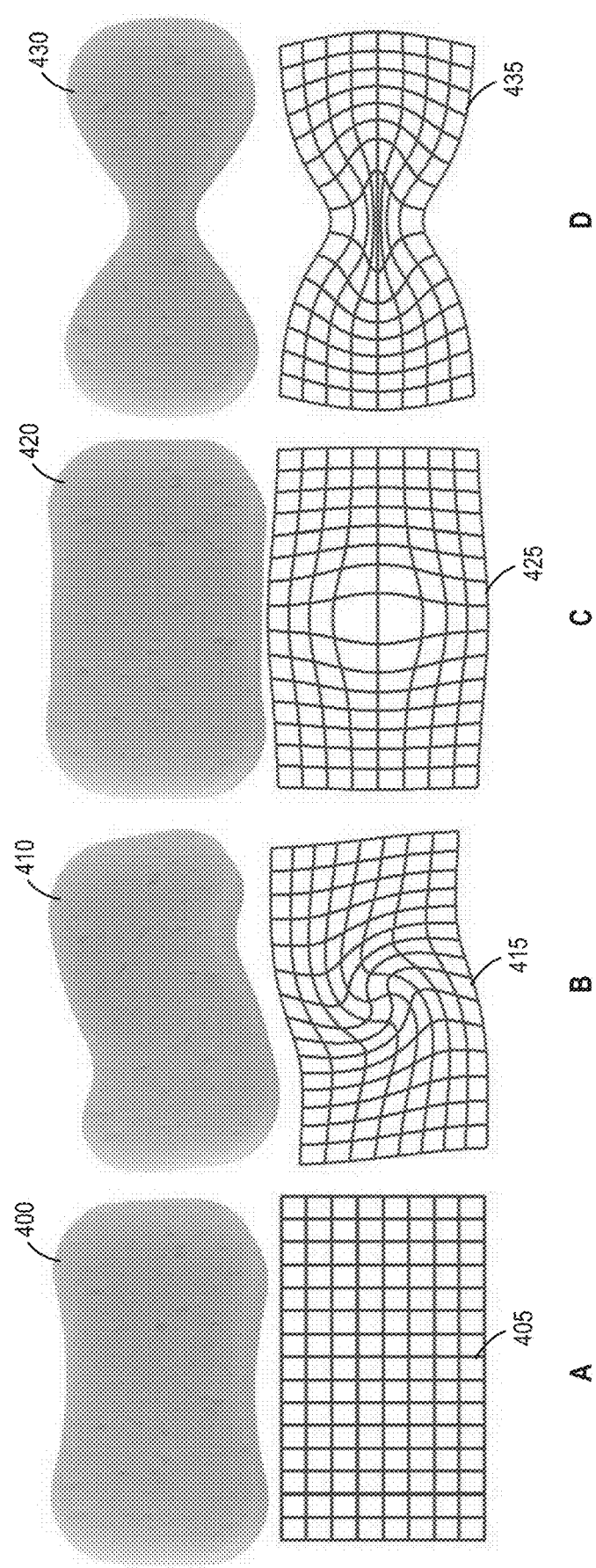
FIG. 4 illustrates example deformations using elastic locally affine brushes, according to an embodiment.

FIG. 4 illustrates example deformations using elastic locally affine brushes, according to an embodiment. In addition to using regularized Kelvinlets to construct grab-like deformations guided by brush tip displacement, as described above, some embodiments may use regularized Kelvinlets in other sculpting operations in which the brush is assigned an affine transformation, instead of a translation. For example, a twist brush may define a rotation centered at $x_0$, and scale and pinch brushes may also be generated based on affine transformations. Examples of twist (panel B), scale (panel C), and pinch (panel D) brush deformations applied to a sponge 400 via locally affine regularized Kelvinlets in 2D, with Poisson ratio $\nu=0.4$, are shown in FIG. 4. Although deformations using 2D locally affine regularized Kelvinlets are shown for illustrative purposes, both 2D and 3D locally affine regularized Kelvinlets are disclosed herein. The scaling brush deformation of panel C differs from the pinching brush deformation of panel D in that all directions are scaled by the same amount by the scaling brush, while the pinching brush compresses in one direction (shown as a vertical compression) and stretches out in an orthogonal direction (shown as a horizontal stretching). Illustratively, grid plots 415, 425, and 435 show local area loss and gain of the sponge after twisting 410, after scaling 420, and after pinching 430. As regularized Kelvinlets are used, overall volume may be preserved after such twisting, scaling, and pinching, unlike the deformations produced by traditional twisting, scaling, and pinching brushes. Further, simplified closed form solutions to the equations of linear elasticity may be used, as discussed in greater detail below. Although twisting, scaling, and pinching brushes are described herein as reference examples, regularized Kelvinlets may be used in any brush that is assigned an affine transformation.

In order to augment twist, scale, and pinch (and other) brushes with elastic responses, one embodiment may use an extension of the formulation of regularized Kelvinlets, described above, that replaces the vector-based load distribution with a matrix-based distribution, while leveraging the linearity of the elastostatics equation (2) with respect to differentiation. More specifically, given a regularized Kelvinlet $u_\epsilon$ and its associated force vector $f$, the directional derivative $g \cdot \nabla$ may be computed along the vector $g$, yielding $$0 = g \cdot \nabla\left[\mu\Delta u_\epsilon + \frac{\mu}{(1-2\nu)}\nabla(\nabla \cdot u_\epsilon) + b\right] =$$

$$\mu\Delta(g \cdot \nabla u_\epsilon) + \frac{\mu}{(1-2\nu)}\nabla[\nabla \cdot (g \cdot \nabla u_\epsilon)] + g \cdot \nabla b =$$

$$\mu\Delta\tilde{u}_\epsilon + \frac{\mu}{(1-2\nu)}\nabla[\nabla \cdot \tilde{u}_\epsilon] + \tilde{b}.$$

This directional derivative implies that a new body load can be defined, and its associated elastic response corresponds to the displacement field $\tilde{u}(r) = g \cdot \nabla u_\epsilon(r)$. Consider the nine possible deformations $\tilde{u}_\epsilon^{ij}$ generated by setting $f = e_i$ and $g = e_j$ for every pair $(i,j)$, where the vectors $\{e_1, e_2, e_3\}$ form an orthonormal bases spanning $\mathbb{R}^3$. Due to superposition, the deformations $\tilde{u}_\epsilon^{ij}$ can be linearly combined with scalar coefficients $F_{ij}$, producing a matrix-driven solution of elastostatics equation (2) of the form $$\tilde{u}_\epsilon(r) = \Sigma_{ij} F_{ij} e_j \cdot \nabla(K_\epsilon(r) e_i) = \nabla K_\epsilon(r):F, \quad (14)$$

where $F = [F_{ij}]$ is a $3 \times 3$ force matrix, and the symbol : indicates the double contraction of F to the third-order tensor $\nabla K_\epsilon(r)$, returning a vector. The force matrix F can generally be of any form and indicates a mix of rotation, scaling, and pinching. Similarly, the body load that generates the deformation $\tilde{u}_\epsilon$, can be written as $$\tilde{b}(r) = \Sigma_{ij} F_{ij} e_i \cdot e_j' \nabla \rho_\epsilon(r) = F \nabla \rho_\epsilon(r). \quad (15)$$

That is, the body force is defined by the force matrix times a falloff vector that is the gradient of the normalized density function, meaning the force applied depends on how aligned the normalized density function is to the matrix. By computing the spatial derivatives of $u_\epsilon$, the displacement field $\tilde{u}_\epsilon(r)$ may be obtained in terms of the force matrix F:

$$\tilde{u}_\epsilon(r) = -a\left(\frac{1}{r_\epsilon^3} + \frac{3\epsilon^2}{2r_\epsilon^5}\right)Fr + b\left[\frac{1}{r_\epsilon^3}(F + F^t + tr(F)I) - \frac{3}{r_\epsilon^5}(r^t Fr)I\right]r. \quad (16)$$

The first term in equation (16) corresponds to an affine transformation Fr with a radial falloff similar to traditional affine brushes, while the second term includes a symmetric affine transformation and controls volume compression through the Poisson ratio $\nu$ that b depends on. The matrix-based extension of the fundamental solution of linear elasticity that is described above is referred to herein as a "locally affine regularized Kelvinlet." For conciseness, the displacement field of equation (16) will be denoted by $\tilde{u}(r) \equiv A_\epsilon(r)\vec{F}$, where $\vec{F} \in \mathbb{R}^9$ is a vectorized form of F and $A(r)$ is the $3 \times 9$ matrix that maps $\vec{F}$ to a displacement at r.

In contrast to equation (8), the deformation generated by equation (16) has zero displacement at the brush center, i.e., $\tilde{u}_\epsilon(0) = 0$, but a non-trivial gradient in terms of F. In addition, specialized versions of the locally affine regularized Kelvinlets may be obtained by setting F to different types of matrices. For example, in the case of a skew-symmetric matrix such as a matrix used to produce the twisting deformation showing in panel B, F can be associated to a vector q via the cross product matrix, i.e., $F \equiv [q]_\times$ where $[q]_\times r = q \times r$, and then equation (16) simplifies to a twist deformation $$t_\epsilon(r) = -a\left(\frac{1}{r_\epsilon^3} + \frac{3\epsilon^2}{2r_\epsilon^5}\right)q \times r. \quad (17)$$

By analyzing the deformation gradient of equation (17), it can be verified that the symmetric part of equation (17), i.e., the strain tensor, is trivial for any r. Consequently, the displacement field has zero divergence (i.e., $\nabla \cdot t_\epsilon(r)=0$) and defines a volume preserving deformation, independent of the Poisson ratio $\nu$. Instead, the curl of the displacement field is non-zero and can be used to relate the vector q to the vorticity at $x_0$ via the linear constraint $\nabla \times t_\epsilon(r)=\overline{\omega}$.

As another example, the scaling deformation shown in panel C may be created using a locally affine regularized Kelvinlet generated by a force matrix of the form $F=sI$, where s is a scalar. In such a case, equation (16) reduces to a scaling deformation $$s_\epsilon(r) = (2b-a)\left(\frac{1}{r_\epsilon^3} + \frac{3\epsilon^2}{2r_\epsilon^5}\right)(sr), \quad (18)$$

where positive values of s represent contractions and negative values determine dilations. Note that $s_\epsilon(r)=0$ for incompressible elastic materials, as $\nu=1/2$ implies $a=2b$.

As yet another example, the pinching deformation shown in panel D may be created using a locally affine regularized Kelvinlet that is constructed based on a symmetric force matrix F with zero trace (in a total of 5 degrees of freedom), and such a locally affine regularized Kelvinlet generates displacements of the form $$p_\epsilon(r) = \frac{(2b-a)}{r_\epsilon^3}Fr - \frac{3}{2r_\epsilon^5}[2b(r^tFr)I + a\epsilon^2 F]r. \quad (19)$$

By computing the displacement gradient $\nabla p_\epsilon$ at $x_0$, it can be observed that the resulting matrix is also symmetric with zero trace, indicating that the deformation generated by $p_\epsilon(r)$ compensates infinitesimal stretching in one direction by contractions in the other directions, which resembles a physical pinching interaction.

As the affine brushes described above are based on the derivative of equation (8), the extrapolation scheme discussed above applies to such displacement fields with no modification. That is, locally affine regularized Kelvinlets may be combined linearly to generate new matrix-driven solutions of linear elasticity with arbitrarily fast far-field decay. In particular, bi-scale and tri-scale brushes may be obtained with $$O\left(\frac{1}{r^4}\right) \text{ and } O\left(\frac{1}{r^6}\right)$$

falloffs, respectively, while the single-scale case has a $$O\left(\frac{1}{r^2}\right)$$

decay.

Figure 5:
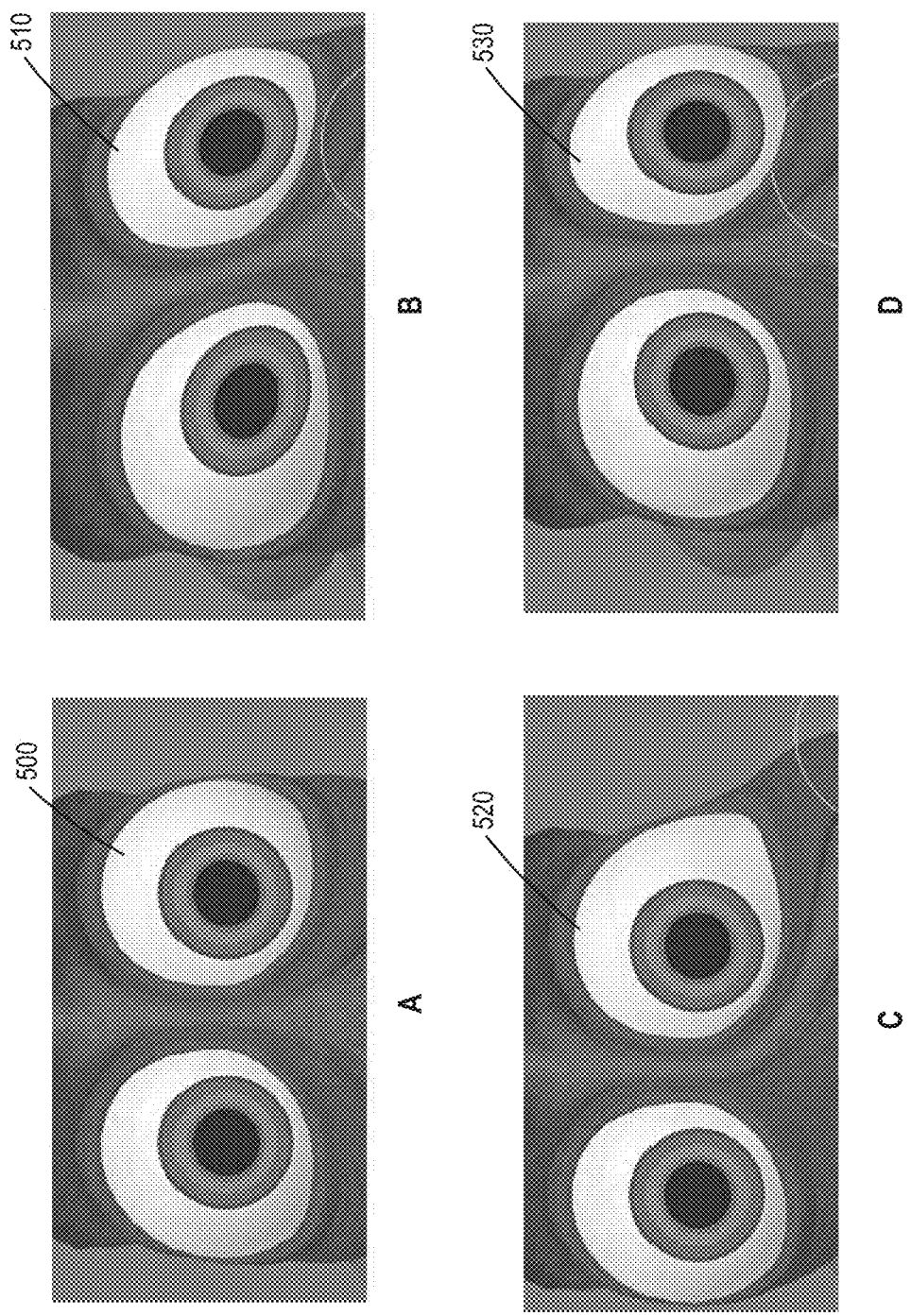
FIG. 5 illustrates constrained deformations using regularized Kelvinlets, according to an embodiment.

FIG. 5 illustrates constrained deformations using regularized Kelvinlets, according to an embodiment. Panel A shows a character's eyes 500 prior to deformation. As shown in panel B, deformation of the eyes 500 using regularized Kelvinlets, without constraints, produces distorted eyes 510. The roundness of the irises and pupils in the eyes can be restored by adding pointwise constraints, as shown in panels C-D. Panel C shows the pinning down of zero displacements at select points of the eyes 520 using a linear combination of brushes, some of which are on the eyes and fix the points of the eyes even when other points are moved by other brushes. As discussed in greater detail below, such pointwise constraints may be enforced by solving a system of equations to make the displacement at the eyes 520 zero. Panel D shows enforcing locally rigid edits via gradient constraints at the points of the eyes, which allow the eyes 530 to move but not to deform by making the gradients at the points of the eyes 530 zero. In particular, the example shown uses a single 3D brush with Poisson ratio $\nu=1/2$ and 160 constraints.

In one embodiment, constrained deformations such as those shown in panels C-D may be generated by superposing regularized Kelvinlets or variants thereof to form new solutions of linear elasticity. In particular, such compound brushes may be used to generate deformations with pointwise constraints. As regularized Kelvinlets are linear in terms of force vectors f and matrices F, constrained deformations may be efficiently computed based on user-prescribed displacements and gradients. As described, the force vector f may also be parameterized in terms of the brush tip displacement $\overline{u}$, i.e., given the brush tip displacement $\overline{u}$, the necessary force vector f can be solved for analytically. Such a constraint may be replicated numerically for a list of brushes. Consider n regularized Kelvinlets placed at $\{x_1, \ldots, x_n\}$ and impose n displacement constraints $\{\overline{u}_1, \ldots, \overline{u}_n\}$, one for each brush center $x_i$. By superposition, these brushes define a solution to equation (2) of the form $$u(x)=\Sigma_{i=1}^n K_{\epsilon_i}(x-x_i)f_i, \quad (20)$$

where $\epsilon_i$ and $f_i$ indicate the radial scale and the force vector for the i-th brush, respectively. The displacement constraints $\overline{u}$ and force vectors f are related by the linear system $\overline{u}=Kf$, where the 3n×3n matrix K has the contribution $K_{\epsilon_i}(x_j-x_i)$ of every i-th brush to every j-th brush center.

As shown in panel C, one scenario for using constrained deformation is when zero displacements are pinned down to n−1 locations, while keeping the n-th brush "live" for interactive sculpting. Given a tip displacement $\overline{u}_n$ updated every user edit, the force vector f can be efficiently computed by exploiting the block structure of the linear system $$\begin{bmatrix} 0 \\ \overline{u}_n \end{bmatrix} = \begin{bmatrix} K_{pp} & K_{pn} \\ K_{np} & K_{nn} \end{bmatrix} \begin{bmatrix} f_p \\ f_n \end{bmatrix}, \quad (21)$$

where the subscript p indicates values for the n−1 pinned brushes, and n denotes the active brush. Note that the block $K_{pp}$ is a nonsymmetric matrix that relates the n−1 pinned brushes to themselves, but is independent of the n-th brush. As a result, the sculpting application may cache the LU factorization of $K_{pp}$ and solve for f rapidly at every user interaction via the Schur complement, which requires a simple 3×3 solve.

Some embodiments may also permit gradients of deformations to be constrained by employing locally affine regularized Kelvinlets in the compound displacement u(x). By doing so, the force matrix F may be used to precisely control the 9 degrees of freedom of the deformation gradient via the linear constraint $G(x_i)=I+\nabla u(x_i)$ at a brush center $x_i$, leading to the aggregated displacement field $$u(x)=\Sigma_{i=1}^n A_{\epsilon_i}(x-x_i)\vec{F}_i, \quad (22)$$

Figure 6:
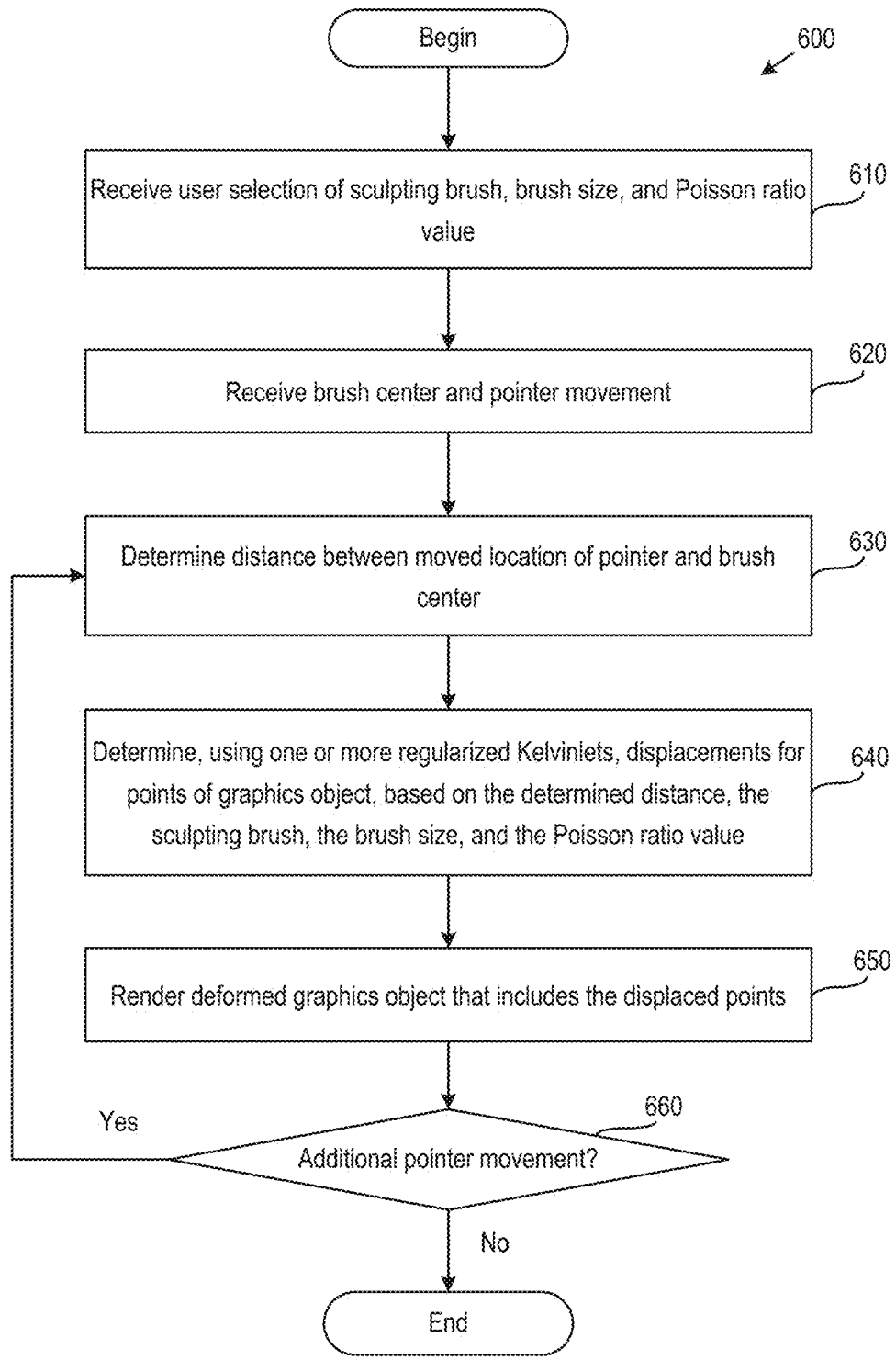
FIG. 6 illustrates a method for performing digital sculpting that may preserve volume (or area in the two-dimensional case), according to an embodiment.

More specialized gradient control may be achieved via individual twist, scale, and pinch brushes. For example, a pointwise vorticity constraint $\nabla \times u$ may be enforced based on the 3 degrees of freedom of the vector q in a twist brush, while the single parameter s of a scaled brush can determine a divergence constraint $\nabla \cdot u$. A pinch brush may be also be used to control the infinitesimal stretches in two directions of a rotated frame, for a total of 5 degrees of freedom. Note that the third infinitesimal stretch is induced by the first two values, as a pinch brush has a traceless gradient. Similar to the displacement case, such gradient constraints relate to their respective force parameters (F, q, ors) through a single linear system. As before, a Schur complement approach may be employed to speed up solve time when sculpting with fixed constraints. Panel D of FIG. 6 shows pointwise gradient constraints being used to ensure rigid deformations in selected regions of the eyes 500.

Some embodiments may also permit symmetrized deformations (not shown) by mirroring a brush operation across a user-specified plane. Such symmetrized deformations may be performed by replicating the brush at $x_0$ to its image point $x_1 = c + M(x_0 - c)$, where $M = I - 2nn^t$ indicates the reflection matrix of a plane passing through a base point c and with a normal vector n. One case of symmetrized physically based deformation includes copying a regularized Kelvinlet $u_\epsilon(r)$ of force vector $f_0$ from $x_0$ to $x_1$, while keeping its radius $\epsilon$ but reflecting its force vector to $f_1 = Mf_0$. The resulting deformation is $$u(x) = K_\epsilon(x-x_0)f_0 + K_\epsilon(x-x_1)f_1. \quad (23)$$

It can be shown that equation (23) satisfies the identity $u(Mx) = Mu(x)$ for any force vector $f_0$ and at any evaluation point x, i.e., the displacement generated by equation (23) at the image of x is the reflection of the displacement at x. As a result, the force vector $f_0$ can also be computed from a given tip displacement $\bar{u}$ via a single constraint at $x_0$. Similarly, the symmetrization of locally affine brushes may be computed by mirroring the force matrix $F_0$ to $F_1 = MF_0M$. The symmetrized displacement field is then $$u(x) = A_\epsilon(x-x_0)\vec{F}_0 + A_\epsilon(x-x_1)\vec{F}_1. \quad (24)$$

As before, the force matrix $F_0$ may be obtained in terms of a gradient constraint, if necessary. In addition, the multi-scale extrapolation described above applies to these formulations with no modification.

Although discussed above primarily with respect to regularized Kelvinlets in 3D, regularized Kelvinlets may be extended to 2D to generate 2D deformations that may preserve area, such as the deformations of panels C-E shown in FIG. 1. For example, 2D Kelvinlets may be used in the sculpting of a 2D virtual character image, or a 3D virtual character with depth information that is preserved. That is, regularized Kelvinlets for an infinite elastic medium in may be used in image editing and volume sculpts restricted to the camera plane (i.e., a deformation in a plane of camera but without accounting for depth of the camera), among other things. In 2D, elastostatics is formulated using the same expressions for the energy (equation (1)) and for the equilibrium state (equation (2)) as in 3D, but with differential operators ($\Delta$, $\nabla$, $\nabla \cdot$) that include only (x,y)-derivatives. Such a restriction introduces a new log term to the singular fundamental solutions, which makes the regularization scheme more elaborate than in the 3D case. In particular, 2D regularized Kelvinlets may be constructed by considering a 2D body as a 3D line force distribution passing through the brush center, which allows 2D solutions to be computed by integrating the associated 3D elastic responses through depth. That is, the 2D regularized Kelvinlets may be obtained by integrating 3D Kelvinlets along the depth direction, making the normalized density function essentially an infinite beam along the depth direction. Let the depth be denoted by the z-axis and $\mathbf{r}$ indicate the 2D relative position vector (i.e., $r = [\mathbf{r}, z]$). Further, the 2D norm is referred to herein as $\mathbf{r} = \|\mathbf{r}\|$, and the regularized 2D distance is referred to as $\mathbf{r}_\epsilon$ (so that $r_\epsilon^2 = \mathbf{r}_\epsilon^2 + z^2$). A 2D force distribution may then be constructed that integrates the smoothed 3D density function $\rho_\epsilon(r)$ in equation (5) along the z-axis, producing $$\rho_\epsilon(r) = \int_{-\infty}^{+\infty} \rho_\epsilon(r) dz = \frac{2\epsilon^2}{\pi} \frac{1}{r_\epsilon^6}. \quad (25)$$

With such a density function, a 2D regularized Kelvinlet may be represented as the solution of equation (2) still in 3D, but generated by an infinite line load $b(\mathbf{r}) = f\rho_\epsilon(\mathbf{r})$, where f has its z-component set to zero. Due to symmetry, the z-component of the 3D deformation generated by $b(\mathbf{r})$ is zero. The equation of elastostatics in 3D with load $b(\mathbf{r})$ then simplifies to its 2D counterpart with no z-derivatives. As a result, the 2D regularized Kelvinlet $u_\epsilon(\mathbf{r})$ can be obtained by carefully integrating the (x,y)-components of the 3D regularized Kelvinlet $u_\epsilon(r)$, i.e., integrating the 3D displacement field $u_\epsilon(r)$ given by equation (6) along the z-axis $$\begin{bmatrix} u_\epsilon^x(r) \\ u_\epsilon^y(r) \end{bmatrix} = \int_{-\infty}^{+\infty} \begin{bmatrix} u_\epsilon^x(r) \\ u_\epsilon^y(r) \end{bmatrix} dz. \quad (26)$$

However, naively substituting equation (8) into equation (26) gives $$\int_{-\infty}^{+\infty} \frac{1}{r_\epsilon} dz = \lim_{L \to \infty} \left[ 2 \ln\left( \frac{L + \sqrt{r_\epsilon^2 + L^2}}{r_\epsilon} \right) \right] \to \infty.$$

This issue can be overcome by exploiting the fact that the equation of elastostatics (2) is invariant to a global translation, i.e., a displacement satisfying equation (2) can be translated by a constant and remain a solution to equation (2). As a result, the 2D displacements in equation (26) can be translated by $-2 \ln(L)$, which leads to $$\lim_{L \to \infty} \left[ 2 \ln\left( \frac{L + \sqrt{r_\epsilon^2 + L^2}}{r_\epsilon} \right) \right] - 2 \ln(L) \to -2 \ln(r_\epsilon).$$

The remaining terms in equation (8) can also be integrated, resulting in:

$$u_\epsilon(r) = \left[ 2(b-a)\ln(r_\epsilon)I + 2b\frac{rr^t}{r_\epsilon^2} + a\frac{\epsilon^2}{r_\epsilon^2}I \right]f. \quad (27)$$

Compared to the 3D solutions, the regularized Kelvinlets in 2D introduce unbounded displacements as $r \to \infty$, due to the presence of the log term in equation (27), making equation (27) inappropriate for localized edits. However, the multi-scale extrapolation described above may be used to produce spatial falloffs. As 2D regularized Kelvinlets are integrated versions of 3D displacements, the same multi-scale extrapolation rules described above for the 3D case work in 2D, and the far-field decay for bi-scale and tri-scale 2D brushes are $$0\left(\frac{1}{r^2}\right) \text{ and } 0\left(\frac{1}{r^4}\right),$$

respectively.

In addition, 2D versions of the locally affine regularized Kelvinlets may be used, and a similar derivation as that discussed above with respect to locally affine regularized Kelvinlets in 3D gives:

$$\tilde{u}_\epsilon(r) = -2a\left(\frac{1}{r_\epsilon^2} + \frac{\epsilon^2}{r_\epsilon^4}\right)Fr + 2b\left[\frac{1}{r_\epsilon^2}(F + F^t + tr(F)I) - \frac{2}{r_\epsilon^4}(r^t F r)I\right]r_1 \quad (28)$$

where F is now a 2×2 force matrix. Expressions for twisting (one degree of freedom), scaling (one degree of freedom), and pinching (two degrees of freedom) may also be derived, similar to the discussion above.

FIG. 6 illustrates a method 600 for performing digital sculpting that may preserve volume (or area in the 2D case), according to an embodiment. As shown, the method 600 begins at step 610, where a sculpting application (e.g., the sculpting application 822 discussed below with respect to FIG. 8) receives a user selection of a sculpting brush, a brush size, and a Poisson ratio value. For example, the selected sculpting brush may be a grab brush, scale brush, twist brush, or pinch brush. As described, the brush size may be used as $\epsilon$ (or one of the $\epsilon_i$'s, such as $\epsilon_1$) in the regularized Kelvinlet or extensions thereof (e.g., equations (8), (12), (16)-(20), (22)-(24), and (27)-(28)) described above, and the brush size may be represented graphically as a radius of circle that is displayed to represent the brush. Further, the Poisson ratio is a manually (or alternatively, an automatically) specified parameter that defines material compressibility.

At step 620, the sculpting application receives a brush center and a pointer movement. In one embodiment, the sculpting application may receive a mouse click and assign the click location as the brush center. In such a case, the sculpting application may further receive a mouse move event whenever a user moves his or her mouse, and the sculpting application may then determine a distance between the moved location of the pointer and the brush center, i.e., determine a displacement, at step 630.

At step 640, the sculpting application determines, using one or more regularized Kelvinlets (in either 2D or 3D), displacements for points of a graphics object, based on the distance determined at step 630 and the sculpting brush, brush size, and Poisson ratio value received at step 610. Such point displacements may be computed in parallel. In one embodiment, the sculpting application first determines a force based on the determined distance, and then plugs the force into the regularized Kelvinlets. It should be understood that the direction of the force vector then depends on the direction of the pointer movement. In the cases of twisting, pinching, scaling, and other elastic locally affine brushes, the displacement may first be mapped to information relating to twisting, pinching, scaling etc. that is then used to obtain an affine transformation matrix that is plugged into equation (16). For example, the pointer displacement in pixels may be mapped to a rotation about the z-axis of a proportional number of degrees in the case of the twisting brush and used to define a corresponding affine transformation matrix, according to known techniques. The sculpting application may deform every (selected) point by moving such points along streamlines defined by the brush's displacement field, as output by the regularized Kelvinlets. For example, such a point-based advection may be computed using a line integration technique, such as a fourth-order Runge-Kutta method or other integrator or substepping scheme. Points that the sculpting brush applies to may or may not be selected by a user in advance. For example, the user may be permitted to select a particular object and force the brush to affect just that object, or the user may apply the sculpting brush to every object in a scene. In one embodiment, the deformation may be evaluated at every (selected) point, including points that are outside the brush radius, as such points may still have non-zero displacement depending on the decay of the brush.

At step 650, the sculpting application renders a deformed graphics object that includes the displaced points. Any suitable rendering technique may be employed to render the deformed graphics object to one or more images, and the rendered images may further be displayed to a user via a display device. Then, if an additional pointer movement is received at step 660, the method 600 returns to step 630, where the sculpting application determines another distance between the moved location of the pointer and the brush center, etc.

Figure 7:
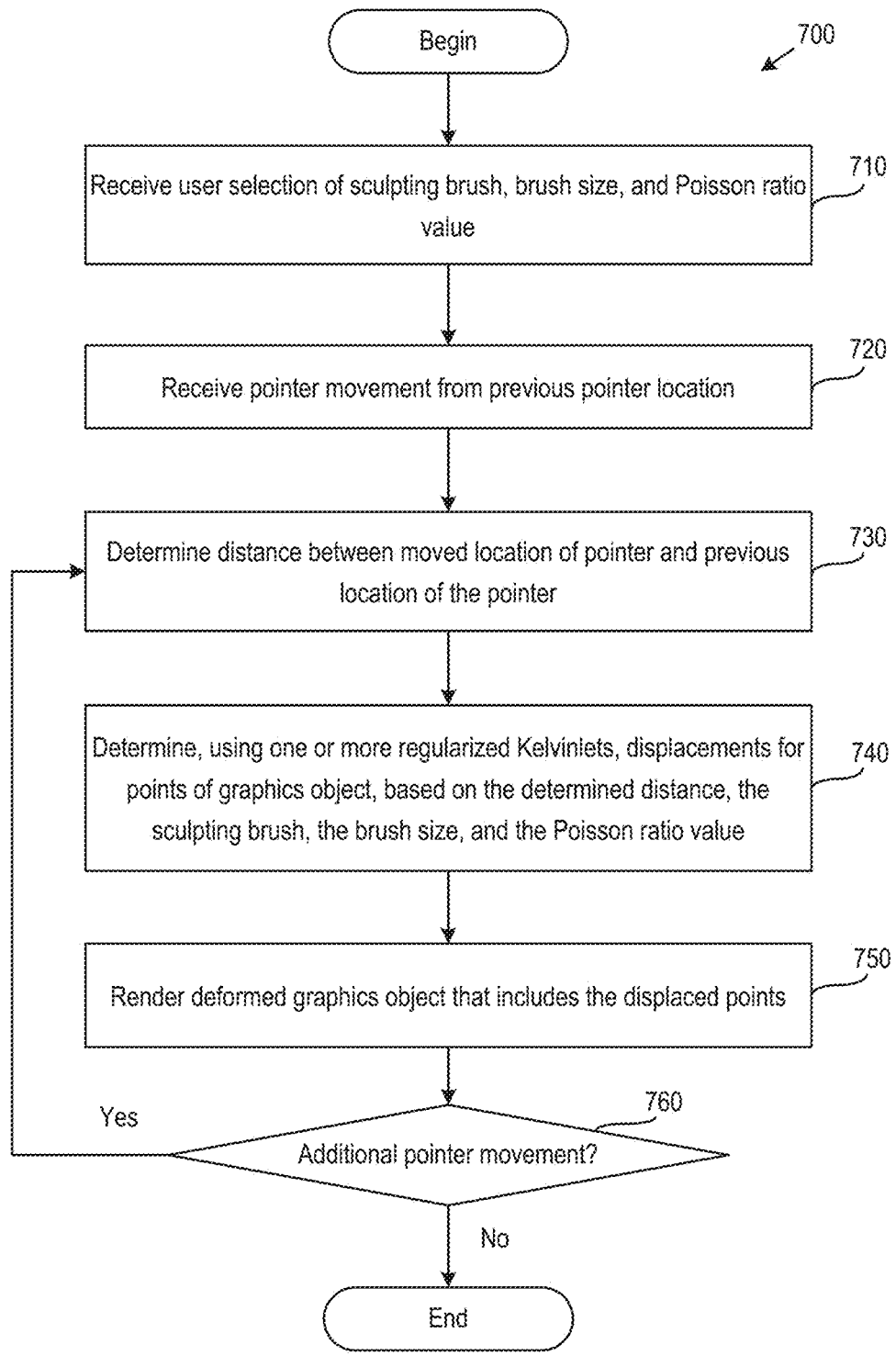
FIG. 7 illustrates a method for performing digital sculpting that may preserve volume (or area in the two-dimensional case), according to another embodiment.

FIG. 7 illustrates a method 700 for performing digital sculpting that may preserve volume (or area in the 2D case), according to another embodiment. As shown, the method 700 begins at step 810, where, similar to step 710, a sculpting application receives a user selection of a sculpting brush, a brush size, and a Poisson ratio value.

At step 720, the sculpting application receives a pointer movement from a previous pointer location, which may or may not be the original brush center. Similar to step 620, the sculpting application may receive, e.g., a mouse move event whenever a user moves his or her mouse. The sculpting application then determines, at step 730, a distance between the moved location of the pointer and a previous location of the pointer. For example, the distance between the two pointer locations may be a few pixels.

At step 740, the sculpting application determines, using one or more regularized Kelvinlets (in 2D or 3D), displacements for points of a graphics object, based on the distance determined at step 730 and the sculpting brush, the brush size, and the Poisson ratio value received at step 710. Step 740 is similar to step 640 of the method 600 (e.g., the point displacements may be computed in parallel) described above, except the distance between the moved location of the pointer and the previous location of the pointer is used to determine a force vector that is plugged into the regularized Kelvinlets, in contrast to the force vector in method 600, which as described above is determined based on the distance between the moved location of the pointer and the original (e.g., mouse click) location of the pointer that remains a stationary center of the brush. That is, rather than making the center of the brush fixed at the original location of the pointer as in the method 600, the method 700 allows the center of the brush to track the pointer, such that the brush is moving along with the pointer. Unlike the sculpting brush in which the brush center remains stationary and can produce displacements with artifacts under large deformations, this "moving" brush in which the brush center is advected throughout the course of the edit resets the force vector to the latest pointer shift and reproduces the deformation of a sequence of small edits using the sculpting brush of the method 600, thereby reducing distortions under large deformations. Further, the deformation generated by the moving brush is path-dependent and may not restore the original graphics object shape if the pointer moves back to its original location. That is, some plasticity is introduced with a "memory" of the brush deformation.

At step 750, the sculpting application renders a deformed graphics object that includes the displaced points. Any suitable rendering technique may be employed to render the deformed graphics object to one or more images, and the rendered images may further be displayed to a user via a display device. Then, if an additional pointer movement is received at step 760, the method 700 returns to step 730, where the sculpting application determines another distance between the moved location of the pointer and a previous location of the pointer.

Figure 8:
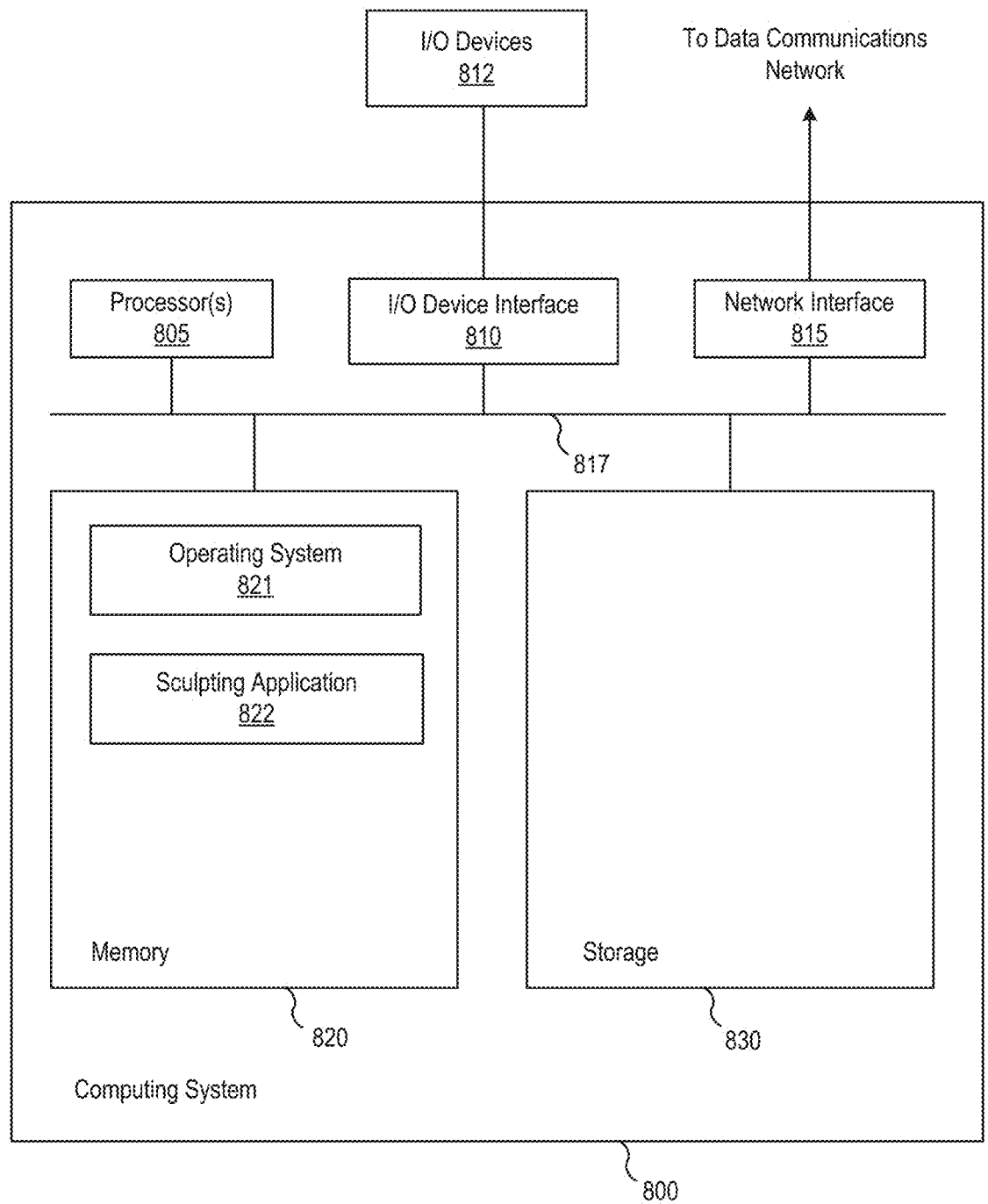
FIG. 8 illustrates a system in which an embodiment may be implemented.

FIG. 8 illustrates a system 800 in which an embodiment may be implemented. As shown, the system 800 includes, without limitation, a central processing unit (CPU) 805, a network interface 815 connecting the system to a network 816, an interconnect 817, a memory 820, and storage 830. The system 800 may also include an I/O device interface 810 connecting I/O devices 812 (e.g., keyboard, display and mouse devices) to the system 800.

The CPU 805 retrieves and executes programming instructions stored in the memory 820. Similarly, the CPU 805 stores and retrieves application data residing in the memory 820. The interconnect 817 facilitates transmission, such as of programming instructions and application data, between the CPU 805, I/O device interface 810, storage 830, network interface 815, and memory 820. CPU 805 is included to be representative of a single CPU, multiple CPUs, a single CPU having multiple processing cores, one or more graphics processing units (GPUs), and the like. And the memory 820 is generally included to be representative of a random access memory. The storage 830 may be a disk drive storage device. Although shown as a single unit, the storage 830 may be a combination of fixed and/or removable storage devices, such as magnetic disk drives, flash drives, removable memory cards or optical storage, network attached storage (NAS), or a storage area-network (SAN). Further, system 800 is included to be representative of a physical computing system as well as virtual machine instances hosted on a set of underlying physical computing systems. Further still, although shown as a single computing system, one of ordinary skill in the art will recognized that the components of the system 800 shown in FIG. 8 may be distributed across multiple computing systems connected by a data communications network.

As shown, the memory 820 includes an operating system 821 and a sculpting application 822. Illustratively, the operating system 821 may include Linux® or Windows®. The sculpting application 822 is configured to simulate a response to sculpting of a material and render the simulation to image frames, thereby permitting a user to interactively sculpt the material. In one embodiment, the sculpting application 822 may receive a user selection of a sculpting brush, a brush size, and a Poisson ratio value; receive a pointer movement; determine a distance between the moved location of the pointer and an original location of the pointer; determine, using one or more regularized Kelvinlets, displacements for points of a graphics object based on the determined distance, the brush size, and the Poisson ratio value; and render a deformed graphics object that includes the displaced points, according to the method 600 described above with respect to FIG. 6. In another embodiment, the sculpting application 822 may receive a user selection of a sculpting brush, a brush size, and a Poisson ratio value; receive a pointer movement; determine a distance between the moved location of the pointer and a previous location of the pointer; determine, using one or more regularized Kelvinlets, displacements for points of a graphics object based on the determined distance, the brush size, and the Poisson ratio value; and render a deformed graphics object that includes the displaced points, according to the method 700 described above with respect to FIG. 7.

Although described above primarily with respect to regularized Kelvinlets that can produce nonlocal deformations, such nonlocal deformations may be unintended and undesirable in certain circumstances, and some embodiments may also apply post-processing, such as surface-based masking, to eliminate nonlocal deformations.

Advantageously, the regularized Kelvinlets and extensions disclosed herein may be used to produce volume-aware (or area-aware) deformations that are relatively efficient to evaluate and easy to parallelize in sculpting brushes. Experience has shown that such regularized Kelvinlets can capture broad volume (and area) deformations even with no knowledge of surface structure, in contrast to traditional brushes that may collapse volumes (and areas). Further, use of regularized Kelvinlets permits real-time feedback, as the regularized Kelvinlets are closed-form analytical expressions and do not require the spatial discretization of elastic objects. This trade-off permits some physical behavior to be injected to improve sculpting brushes, such as grab, twist, scale, and pinch brushes. In addition, long-range interactions may be addressed using multi-scale extrapolation to adjust the long-range falloff of the sculpting brushes, and various pointwise constraints may be resolved using linear solves. The physically-based sculpting brushes disclosed herein may also complement existing modeling techniques. For example, deformations produced by sculpting brushes disclosed herein may be used as initial guesses for iterative mesh-based deformers and simulators.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
receiving a selection of a sculpting brush and a brush size;
receiving a movement from an input device;
determining a deformation of a graphics object by operation of one or more computer processors and based, at least in part, on: the selected sculpting brush and brush size, the received movement from the input device, and one or more regularized solutions to an equation of linear elasticity, wherein the one or more regularized solutions include a specified Poisson ratio parameter value; and
rendering one or more images based, at least in part, on the graphics object with the determined deformation.

2. The method of claim 1, wherein the one or more regularized solutions to the equation of linear elasticity are regularized using at least a normalized density function.

3. The method of claim 1, wherein the one or more regularized solutions to the equation of linear elasticity include a three-dimensional Kelvinlet defined as a function of at least: a three-dimensional relative position, a three-dimensional regularized distance, a shear modulus, the Poisson ratio parameter value, a radial scale, and a three-dimensional force vector.

4. The method of claim 1, wherein the one or more regularized solutions to the equation of linear elasticity include a two-dimensional Kelvinlet defined as a function of at least: a two-dimensional relative position, a two-dimensional regularized distance, a shear modulus, the Poisson ratio parameter value, a radial scale, and a two-dimensional force vector.

5. The method of claim 1, wherein the one or more regularized solutions to the equation of linear elasticity include a linear combination of regularized solutions to the equation of linear elasticity with different radial scales.

6. The method of claim 1, wherein the determining the deformation of the graphics object includes determining a force vector or an affine transformation based, at least in part, on the received movement from the input device.

7. The method of claim 1, wherein the selected sculpting brush includes a superposition of a plurality of sculpting brushes.

8. The method of claim 1, wherein the determining the deformation of the graphics object includes enforcing at least one gradient constraint.

9. The method of claim 1, wherein the deformation is determined further based on a reflection of a distance determined based on the received movement from the input device.

10. The method of claim 1, wherein:
the determining the deformation includes determining a distance based, at least in part, on the received movement from the input device; and
the determined distance is one of a distance between a moved location of the input device and an original location of the input device, or a distance between the moved location of the input device and a previous moved location of the input device.

11. The method of claim 1, wherein the selected sculpting brush includes one of a grab brush, a scale brush, a twist brush, or a pinch brush.

12. The method of claim 1, wherein the specified Poisson ratio parameter value is not infinite or one half.

13. A non-transitory computer-readable medium storing a program which, when executed by a processor, performs operations comprising:
receiving a selection of a sculpting brush and a brush size;
receiving a movement from an input device;
determining a deformation of a graphics object based, at least in part, on: the selected sculpting brush and brush size, the received movement from the input device, and one or more regularized solutions to an equation of linear elasticity, wherein the one or more regularized solutions include a specified Poisson ratio parameter value; and
rendering one or more images based, at least in part, on the graphics object with the determined deformation.

14. The non-transitory computer-readable medium of claim 13, wherein the one or more regularized solutions to the equation of linear elasticity include at least one of a three-dimensional Kelvinlet or a two-dimensional Kelvinlet:
wherein the three-dimensional Kelvinlet is defined as a function of at least: a three-dimensional relative position, a three-dimensional regularized distance, a shear modulus, the Poisson ratio parameter value, a radial scale, and a three-dimensional force vector;
wherein the two-dimensional Kelvinlet is defined as a function of at least: a two-dimensional relative position, a two-dimensional regularized distance, the shear modulus, the Poisson ratio parameter value, the radial scale, and a two-dimensional force vector.

15. The non-transitory computer-readable medium of claim 13, wherein the one or more regularized solutions to the equation of linear elasticity include a linear combination of regularized solutions to the equation of linear elasticity with different radial scales.

16. The non-transitory computer-readable medium of claim 13, wherein the determining the deformation of the graphics object includes determining a force vector or an affine transformation based, at least in part, on the received movement from the input device.

17. The non-transitory computer-readable medium of claim 13, wherein either:
the selected sculpting brush includes a superposition of a plurality of sculpting brushes; or
the determining the deformation of the graphics object includes enforcing at least one gradient constraint.

18. The non-transitory computer-readable medium of claim 13, wherein:
the determining the deformation includes determining a distance based, at least in part, on the received movement from the input device; and
the determined distance is one of a distance between a moved location of the input device and an original location of the input device, or a distance between the moved location of the input device and a previous moved location of the input device.

19. The non-transitory computer-readable medium of claim 13, wherein the specified Poisson ratio parameter value is not infinite or one half.

20. A system, comprising:
a processor; and
a memory, wherein the memory includes an application program configured to perform operations comprising:

receiving a selection of a sculpting brush and a brush size;
receiving a movement from an input device;
determining a deformation of a graphics object based, at least in part, on: the selected sculpting brush and brush size, the received movement from the input device, and one or more regularized solutions to an equation of linear elasticity, wherein the one or more regularized solutions include a specified Poisson ratio parameter value; and
rendering one or more images based, at least in part, on the graphics object with the determined deformation.

* * * * *

UNITED STATES PATENT AND TRADEMARK OFFICE
CERTIFICATE OF CORRECTION

PATENT NO. : 10,586,401 B2
APPLICATION NO. : 15/969587
DATED : March 10, 2020
INVENTOR(S) : Fernando Ferrari De Goes et al.

Page 1 of 1

It is certified that error appears in the above-identified patent and that said Letters Patent is hereby corrected as shown below:

In the Specification

In Column 9, Line 39, delete "ūt" and insert -- ū --, therefor.

In Column 15, Line 53, after "in" insert -- $\mathbb{R}^2$ --.

In the Claims

In Column 22, Line 24, in Claim 14, delete "Kelvinlet:" and insert -- Kelvinlet; --, therefor.

Signed and Sealed this
Twenty-sixth Day of May, 2020

Andrei Iancu
*Director of the United States Patent and Trademark Office*